US008148932B2

(12) United States Patent
Yoo et al.

(10) Patent No.: US 8,148,932 B2

(45) Date of Patent: Apr. 3, 2012

(54) SYSTEM AND METHOD FOR DRIVING A DRAWER IN A REFRIGERATOR

(75) Inventors: Myung Keun Yoo, Seoul (KR); Yong Hwan Eom, Seoul (KR); Ok Sun Yu, Seoul (KR); Hyoun Jeong Shin, Seoul (KR)

(73) Assignee: LG Electronics Inc., Seoul (KR)

( * ) Notice: Subject to any disclaimer, the term of this patent is extended or adjusted under 35 U.S.C. 154(b) by 529 days.

(21) Appl. No.: 12/390,524

(22) Filed: Feb. 23, 2009

(65) Prior Publication Data

US 2009/0248207 A1 Oct. 1, 2009

Related U.S. Application Data

(63) Continuation-in-part of application No. PCT/KR2008/001696, filed on Mar. 26, 2008.

(51) Int. Cl.
*G05D 15/00* (2006.01)

(52) U.S. Cl. ......... 318/646; 318/264; 318/466; 312/219

(58) Field of Classification Search ............... 312/405.1, 312/319.1, 319.5, 219, 330.1, 348.1; 700/275, 700/244; 318/646, 466, 568.13, 266; 62/131, 62/407

See application file for complete search history.

(56) References Cited

U.S. PATENT DOCUMENTS

| | | | | |
|---|---|---|---|---|
| 5,280,227 | A | 1/1994 | Bashark | |
| 5,392,951 | A * | 2/1995 | Gardner et al. | 312/319.5 |
| 5,445,294 | A * | 8/1995 | Gardner et al. | 221/1 |
| 5,899,083 | A | 5/1999 | Peterson et al. | |
| 5,940,306 | A * | 8/1999 | Gardner et al. | 700/244 |
| 6,130,621 | A * | 10/2000 | Weiss | 340/5.28 |
| 6,779,855 | B2 | 8/2004 | Hoffman | |
| 7,063,398 | B2 * | 6/2006 | Hoffman | 312/219 |
| 7,282,884 | B2 | 10/2007 | Huber et al. | |
| 7,307,395 | B2 | 12/2007 | Bouamra et al. | |
| 7,407,210 | B2 | 8/2008 | Arbaugh et al. | |
| 7,484,817 | B2 * | 2/2009 | Hoffman et al. | 312/219 |
| 7,533,947 | B2 | 5/2009 | Kim et al. | |
| 7,587,907 | B2 | 9/2009 | Kim et al. | |
| 7,594,707 | B2 | 9/2009 | Kunkle et al. | |
| 7,602,135 | B2 * | 10/2009 | Huber et al. | 318/651 |
| 7,641,707 | B2 | 1/2010 | Kang et al. | |

(Continued)

FOREIGN PATENT DOCUMENTS

CN 2406551 A 11/2000

(Continued)

OTHER PUBLICATIONS

International Search Report dated Oct. 22, 2010 (Application No. PCT/KR2010/001497).

(Continued)

*Primary Examiner* — Paul Ip

(74) *Attorney, Agent, or Firm* — KED & Associates, LLP

(57) ABSTRACT

A system and method for driving a drawer of a refrigerator are provided. This system allows a drawer to be automatically withdrawn from and/or inserted into a main body of the refrigerator. This system also allows a drawer which has been stopped during the withdrawal process to be further withdrawn from the main body so as to complete action on a withdrawal command, or to be re-inserted into the main body, so as to reduce cool air loss.

30 Claims, 9 Drawing Sheets

U.S. PATENT DOCUMENTS

| | | | | |
|---|---|---|---|---|
| 7,688,015 | B2 * | 3/2010 | Wenzel et al. | 318/466 |
| 7,731,314 | B2 | 6/2010 | Kim | |
| 7,784,888 | B2 | 8/2010 | Oh et al. | |
| 7,802,515 | B2 | 9/2010 | Suetsugu | |
| 7,812,561 | B2 * | 10/2010 | Hagen et al. | 318/568.13 |
| 2002/0171335 | A1 | 11/2002 | Held | |
| 2003/0078710 | A1 | 4/2003 | Li | |
| 2004/0035129 | A1 | 2/2004 | Kaiser | |
| 2004/0100165 | A1 | 5/2004 | Hoffman | |
| 2004/0100166 | A1 * | 5/2004 | Hoffman | 312/219 |
| 2004/0100169 | A1 * | 5/2004 | Huber et al. | 312/319.5 |
| 2004/0138843 | A1 | 7/2004 | Bouamra et al. | |
| 2005/0284113 | A1 | 12/2005 | Jang et al. | |
| 2006/0061245 | A1 * | 3/2006 | Huber et al. | 312/348.1 |
| 2006/0087207 | A1 | 4/2006 | Oh et al. | |
| 2006/0087208 | A1 | 4/2006 | Oh et al. | |
| 2006/0096304 | A1 * | 5/2006 | Kim et al. | 62/132 |
| 2006/0104756 | A1 * | 5/2006 | Kim et al. | 414/288 |
| 2006/0196198 | A1 * | 9/2006 | Kim et al. | 62/131 |
| 2006/0207283 | A1 * | 9/2006 | Kim et al. | 62/407 |
| 2006/0226749 | A1 * | 10/2006 | Kim | 312/404 |
| 2006/0242988 | A1 | 11/2006 | Kim et al. | |
| 2006/0261775 | A1 * | 11/2006 | Huber et al. | 318/646 |
| 2006/0267461 | A1 * | 11/2006 | Hoffman | 312/219 |
| 2007/0013274 | A1 * | 1/2007 | Hoffman | 312/219 |
| 2007/0170828 | A1 | 7/2007 | Hoshide et al. | |
| 2007/0256036 | A1 | 11/2007 | Johnson et al. | |
| 2008/0018215 | A1 | 1/2008 | Carden et al. | |
| 2008/0116777 | A1 * | 5/2008 | Kappler et al. | 312/404 |
| 2008/0163639 | A1 | 7/2008 | Hwang | |
| 2008/0302114 | A1 | 12/2008 | Kelly et al. | |
| 2009/0091223 | A1 * | 4/2009 | Hagen et al. | 312/330.1 |
| 2009/0102338 | A1 * | 4/2009 | Wenzel et al. | 312/319.1 |
| 2009/0160297 | A1 | 6/2009 | Anikhindi et al. | |
| 2009/0199484 | A1 * | 8/2009 | Zipp | 49/358 |
| 2009/0206715 | A1 * | 8/2009 | Scheffknecht et al. | 312/319.8 |
| 2009/0243454 | A1 | 10/2009 | Yoo et al. | |
| 2009/0248205 | A1 | 10/2009 | Yu et al. | |
| 2009/0248207 | A1 | 10/2009 | Yoo et al. | |
| 2009/0254221 | A1 | 10/2009 | Kang | |

FOREIGN PATENT DOCUMENTS

| | | |
|---|---|---|
| CN | 1468569 A | 1/2004 |
| EP | 0779484 | 6/1997 |
| JP | 1990-103388 | 4/1990 |
| JP | 1990-106686 | 4/1990 |
| JP | 1990-136686 | 5/1990 |
| JP | 1990-146487 | 6/1990 |
| JP | 1991-045820 | 2/1991 |
| JP | 07-174459 | 7/1995 |
| JP | 1995-174459 | 7/1995 |
| JP | 1999-094455 | 4/1999 |
| JP | 2005-326044 | 11/2005 |
| JP | 2006-023039 | 1/2006 |
| JP | 2006-046741 | 2/2006 |
| JP | 2006-046748 | 2/2006 |
| JP | 2006-145055 | 6/2006 |
| JP | 2006-250485 | 9/2006 |
| JP | 2007-017018 | 1/2007 |
| JP | 2007-093208 | 4/2007 |
| JP | 2007-132605 | 5/2007 |
| JP | 2008-8550 | 1/2008 |
| JP | 2008-196744 | 8/2008 |
| JP | 2008-196752 | 8/2008 |
| JP | 2009-036433 | 2/2009 |
| KR | 1999-003684 | 1/1999 |
| KR | 20-0301747 | 1/2003 |
| KR | 20-0334077 | 11/2003 |
| KR | 2006-0025806 | 3/2006 |
| KR | 10-0634366 | 10/2006 |
| KR | 2007-008046 | 1/2008 |
| WO | WO 2006/126584 | 11/2006 |
| WO | WO2007/009783 | 1/2007 |

OTHER PUBLICATIONS

International Search Report issued in PCT Application No. PCT/KR2010/001496 dated Oct. 22, 2010.

International Search Report issued in PCT Application No. PCT/KR2010/001495 dated Oct. 25, 2010.

International Search Report issued in PCT Application No. PCT/KR2010/001409 dated Oct. 25, 2010.

International Search Report issued in PCT Application No. PCT/KR2010/001410 dated Oct. 25, 2010.

International Search Report dated Dec. 8, 2008.

International Search Report dated Dec. 3, 2008.

U.S. Office Action issued in U.S. Appl. No. 12/390,520 dated Apr. 22, 2011.

Chinese Office Action issued in CN Application No. 2011092100646340 dated Sep. 26, 2011.

U.S. Office Action issued in U.S. Appl. No. 12/510,372 dated Nov. 30, 2011.

U.S. Office Action issued in U.S. Appl. No. 12/345,946 dated May 19, 2011.

U.S. Office Action issued in U.S. Appl. No. 12/345,984 dated May 23, 2011.

U.S. Office Action issued in U.S. Appl. No. 12/345,946 dated Sep. 26, 2011.

U.S. Office Action issued in U.S. Appl. No. 12/345,984 dated Sep. 26, 2011.

* cited by examiner

SYSTEM AND METHOD FOR DRIVING A DRAWER IN A REFRIGERATOR

This application is a continuation-in-part of PCT Application No. PCT/KR2008/001696 filed on Mar. 26, 2008. This document is hereby incorporated by reference.

BACKGROUND

1. Field

This relates to a refrigerator, and in particular, to a structure for moving a drawer of a refrigerator.

2. Background

A refrigerator is an appliance for the storage of fresh food. Refrigerators may generally be categorized into top freezer types, bottom freezer types, and side-by-side refrigerators, depending on the respective positions of the freezer and refrigeration compartments.

For example, the bottom freezer configuration has the freezer compartment positioned below the refrigeration compartment. In the bottom freezer configuration, a door that pivots about an edge of the main body may open and close the refrigeration compartment, and a door that opens and closes the freezer compartment may be provided with a storage box door that moves forward and rearward relative to the main body.

Because in this configuration the freezer compartment is provided below the refrigeration compartment, a user stoops to grasp and pull the door forward in order to open the freezer compartment. A system to facilitate the opening and/or closing of such a freezer compartment would enhance the utility or convenience of a bottom freezer type refrigerator. Further, a system to facilitate opening and/or closing of a drawer in a refrigerator would enhance user convenience.

BRIEF DESCRIPTION OF THE DRAWINGS

The embodiments will be described in detail with reference to the following drawings in which like reference numerals refer to like elements wherein.

DETAILED DESCRIPTION

Figure 1:
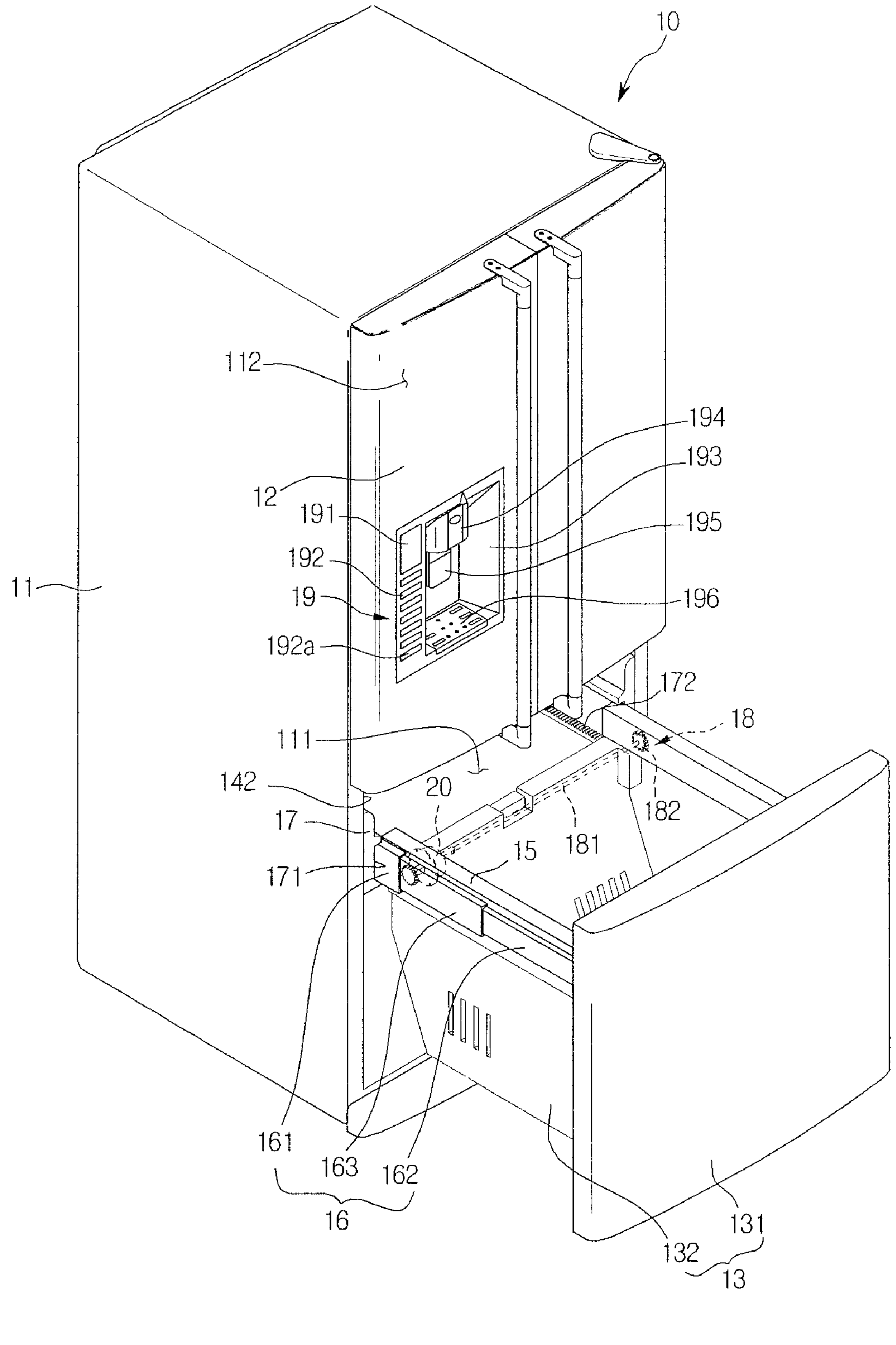
FIG. 1 is a perspective view of an exemplary refrigerator provided with a drawer movement structure according to an embodiment as broadly described herein.

To facilitate the opening and/or closing of a compartment of a refrigerator, such as, for example, a lower freezer compartment, an automatic opening configuration may be provided. This automatic opener may determine when a user intends to open a compartment door by sensing a gripping or grasping of a door handle as the compartment door is moved a predetermined distance forward from the front surface of the main body, and then automatically moving the door, and the storage box to which it is coupled, to an open position. A motor may be provided with the appropriate compartment, and a rotating member such as, for example, a gear may be connected to a shaft of the motor. As an undersurface of the storage box comes into contact with the rotating member, the storage box moves forward and rearward based on a direction of the rotation of the rotating member.

However, when using this type of automatic opener, a user still grasps and exerts a pulling force on the handle to initiate the automatic opening. Typically, a sealing member such as, for example, a gasket may be attached to the rear surface of the storage box to prevent cold air leakage, and an adhering member such, for example, as a magnet may be provided inside the sealing member to maintain a tight seal therebetween. Thus in order to initiate movement of the storage box, a user grasps and pulls the storage box with a force greater than the magnetic force. In addition, when the storage box is provided at the bottom of the refrigerator, a user stoops to pull it out, which may be physically challenging for children, the elderly, and smaller users. Also, the handle necessarily protrudes from the front surface of the storage box, thereby increasing the dimensions for the packaging and installation of the refrigerator and presenting a potential hazard for users who may collide with the handle. It is difficult or not possible to omit the handle in this type of automatic opener.

Further, the time it takes for a user to grasp a handle and initiate movement of the storage box, coupled with the time it takes for a controller to sense this movement and provide for automated movement of the storage box may be excessive, thus reducing utility. Additionally, the automatic opener may only move the storage box a distance adequate to separate it from the refrigerator main body, and thus a user still directly grasps the handle and pulls the storage box further forward thereafter. When the weight of food stored in the storage box may be considerable, withdrawing the storage box in this manner may be difficult.

By providing a drive motor and a gear assembly on the floor of the refrigeration compartment or the freezer compartment to provide for movement of a storage box provided therein, the storage space within the refrigerator may be reduced by the volume consumed by the motor and gear assembly. This may also result in a loss of insulation in the refrigerator main body. That is, if the inner case were to be recessed to receive a motor, an insulating layer between the inner case and an outer case of the main body would become thinner, thus reducing insulation between the inside and outside of the refrigerator.

Further, if movement of the storage box is driven by this type of motor and gear assembly, such a gear assembly would likely include a rack that engages a gear, the rack extending from front to rear along the floor of the storage box. Thus, the length of the rack would necessarily be limited by the overall length of the floor of the storage box. For example, the rear surface of a freezer compartment storage box in a bottom freezer refrigerator may be sloped to accommodate a machine room provided at a lower rear portion of the refrigerator. Thus the length of the lower portion of the freezer compartment storage box may be less than the length of the upper portion thereof, limiting accessibility to the interior of the storage box. If a plurality of storage boxes are provided one on top of another, a separate motor and gear assembly may be provided for each storage box, thereby complicating the support structure required for the stack storage boxes.

Additionally, the automatic opener described above may include a mechanism such as, for example, a switch, to simply sense whether or not the storage box has been fully withdrawn or closed. However, this switch would not be necessarily sense whether or not the storage box is being withdrawn at a normal speed, whether or not the withdrawing of the storage box is impeded by obstacles, and whether or not the storage box is being withdrawn at a set speed regardless of the weight of food stored therein.

Figure 2:
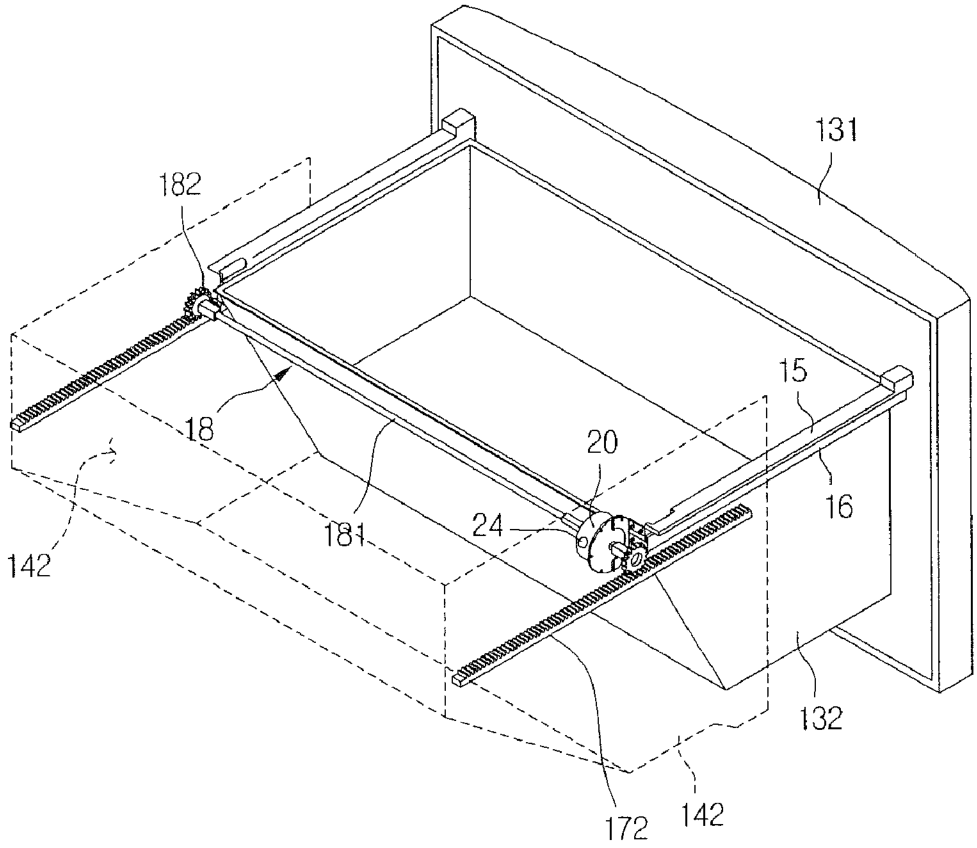
FIG. 2 is a perspective view of a storage box assembly for the exemplary refrigerator shown in FIG. 1.

The exemplary bottom freezer type refrigerator 10 shown in FIGS. 1 and 2 may include a main body 11 that defines a refrigeration compartment 112 and a freezer compartment 111. A refrigeration compartment door 12 may rotatably installed on the front of the main body 11 to open and close the refrigeration compartment, and a drawer 13 may be provided below the refrigeration compartment. The drawer 13 may be inserted into and withdrawn from the inside of the freezer compartment 111 so that goods or items stored therein may be accessed as necessary.

The drawer 13 may include a door 131 that forms a front exterior of the drawer 13 and a storage box 132 provided behind the door 131 to receive store food items. A frame 15 may extend rearward from a rear of the freezer compartment door 131 to support opposite side edges of the storage box 132, and a rail assembly 16 may be positioned corresponding to the frame 15 to allow the storage box 132 to be inserted into and withdrawn from the freezer compartment 111. The rail assembly 16 may have a first end fixed to an inner surface of the freezer compartment 111 formed by an inner case 142 of the refrigerator 10, and a second end fixed to the frame 15 to allow the rail assembly 16 to be adjusted in length and to allow the storage box 132 to be inserted into and withdrawn from the freezer compartment 111 along the rail assembly 16.

The refrigerator 10 may also include an anti-wobble, or alignment apparatus for preventing wobbling or mis-alignment as the storage box 132 is withdrawn from or inserted into the freezer compartment 111. A rail guide 17 provided at one or both opposite sides of the freezer compartment 111 corresponding to the rail assembly 16 to hold and guide the rail assembly 16, and a movement apparatus for automatically moving, that is, withdrawing and inserting, the storage box 132 relative to the freezer compartment 111. In detail, the alignment apparatus may include a suspended portion 18 coupled to the rear of the frame 15 to prevent lateral wobbling or uncoordinated lateral movement when the storage box 132 is being withdrawn from or inserted into the freezer compartment 111, and a guide member provided on the rail guide 17 to guide the movement of the suspended portion 18. The guide member may include a rail mounting recess 171 formed in the rail guide 17 to receive the rail assembly 16 and a guide rack 172 that extends from front to rear at the bottom of the rail mounting recess 171.

The suspended portion 18 may include a shaft 181 with its opposite ends connected to a respective portion of the frame 15 provided on opposite sides of the storage box 132, and a pinion 182 provided respectively at one or both ends of the shaft 181. A plurality of gears may be formed on the outer peripheral surface of the pinion 182, and a corresponding plurality of gear teeth may be formed on the upper surface of the guide rack 172 to engage the pinion 182. Accordingly, when the pinion 182 rotates in an engaged state with the guide rack 172, the pinion 182 rolls along the guide rack 172 to in turn move the storage box 132, and the drawer 13 is not biased to the left or right, but is withdrawn in a straight path. Thus, the shaft 181, pinion 182 and guide rack 172 prevent the drawer 13 from wobbling or moving laterally.

In certain embodiments, the drawer 13 may be withdrawn from the refrigerator 10 automatically. For this purpose, the drawer movement apparatus may include a driving force generator coupled to one or all of the pinions 182 to impart a rotational force on the pinions 182, and a driving force transmitter that transmits the driving force from the driving force generator to the pinions 182 to allow the storage box 132 to be moved. The driving force generator may be, for example, a drive motor 20 that provides rotational force to the pinions 182 and the driving force transmitter may be, for example, an anti-wobble or alignment apparatus including the suspended portion 18 and the guide rack 172 as described above. That is, the alignment apparatus may prevent lateral misalignment wobbling of the drawer 13, while also transmitting a driving force that automatically moves the drawer 13. The driving force generator may be provided with the freezer compartment door 131, and may include a drive motor 20 or other driving means capable of automatically moving the drawer 13, such as, for example, an actuator employing a solenoid.

Figure 3:
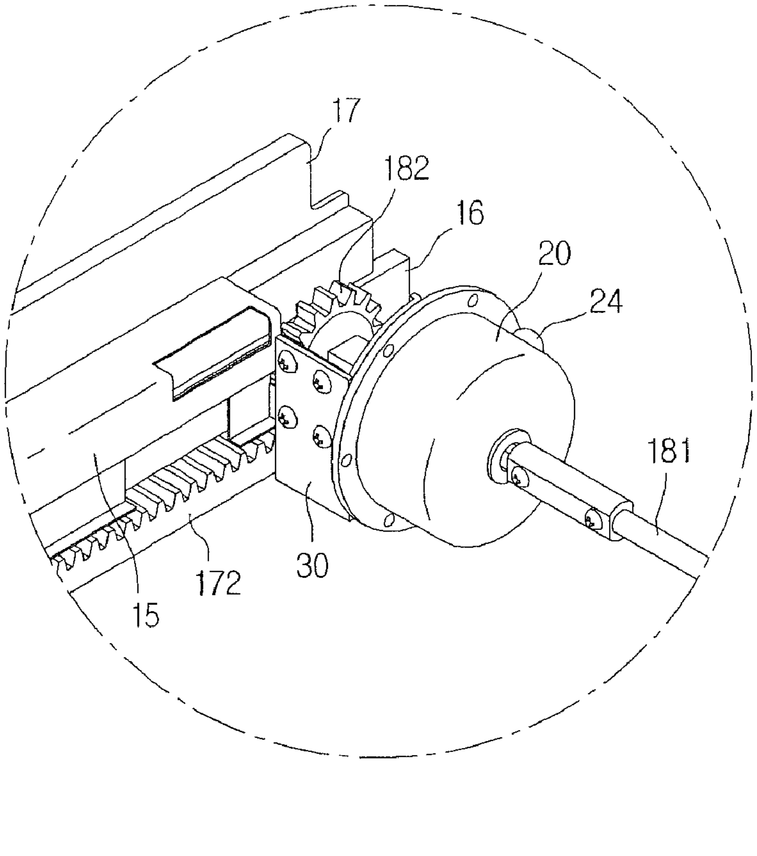
FIG. 3 is a detailed perspective view of a drawer movement apparatus according to an embodiment as broadly described herein.
Figure 4:
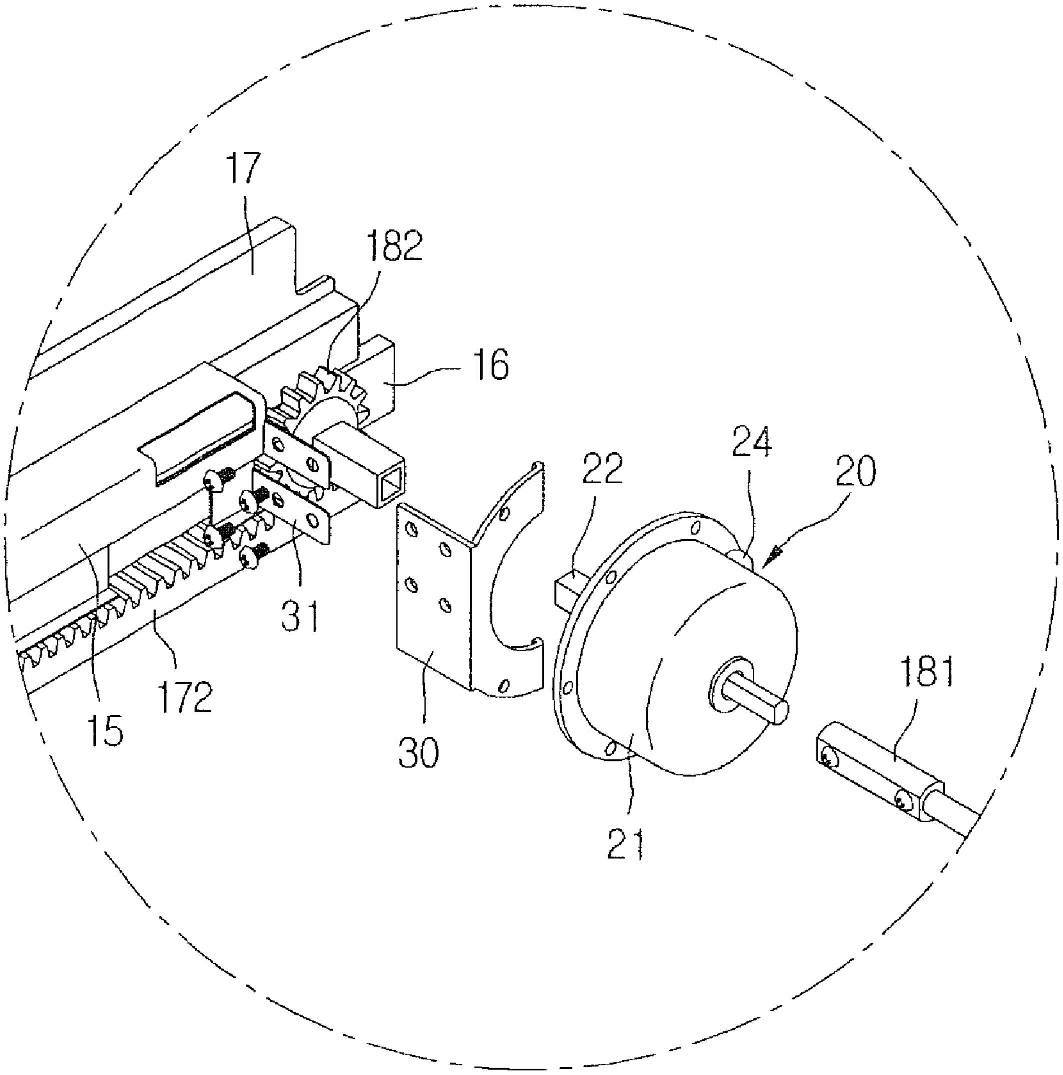
FIG. 4 is an exploded perspective view of the drawer movement apparatus shown in FIG. 3.

A distance detection sensor 24 may be used to detect a withdrawal/insertion distance of the drawer 13. The distance detection sensor 24 may be provided, for example, on an outer circumference of the drive motor 20, as shown in FIGS. 3 and 4, or other location as appropriate. The distance detection sensor 24 may be a sensor that uses infrared rays, ultrasonic waves, or other types of sensors as appropriate. The distance detection sensor 24 may be positioned so as to detect a change or difference in distance between a predetermined portion of the drawer 13 and a corresponding predetermined portion of the compartment in which the drawer 13 is received. For example, the distance detection sensor 24 may be positioned so as to sense a distance, and a change in distance, between the drawer 13 and the rear wall of the compartment.

If, for example, the distance detection sensor 24 is an infrared sensor that senses a distance between the drawer and the rear wall of the compartment, the distance detection sensor 24 may include a light emitting unit and a light reception unit. An infrared signal emitted from the light-emitting unit collides with the rear wall of the compartment and is reflected back to the light reception unit. The main controller 810 may then determine the distance between the drawer 13 and the rear wall of the compartment using a voltage value of the infrared signal detected by the light reception unit. If the distance detection sensor 24 is an ultrasonic wave sensor, the distance may be determined through a similar process.

The rail assembly 16 may include a fixed rail 161 fixed to the rail mounting recess 171, a moving rail 162 fixed to the frame 15, and an extending rail 163 that extends between the fixed rail 161 and the moving rail 162. Depending on a front-to-rear length of the storage box 132, the rail assembly 16 may include one or more extending rails 163. In certain embodiments, the rail assembly 16 may include only the fixed rail 161 and the moving rail 162. Additionally, the shaft 181 and the drive motor 20 may be provided at a rear of the frame 15, or may be provided at a rear of the moving rail 162, depending on the particular storage box 132/refrigerator 10 design. The storage box 132 may be detachably coupled to the frame 15 to allow the storage box 132 to be removed from the refrigerator 10 for periodic cleaning.

A dispenser 19 for dispensing water or ice may be provided at the front of the refrigeration compartment door 12. The dispenser 19 may include a receptacle 193 comprising a recess having a predetermined depth, and a chute 194 and a dispensing tap (not shown in detail) through which ice and water may be dispensed by actuating a lever 195. A water pan 196 may be provided on the floor of the receptacle 193. A display 191 for displaying various data such as, for example, an operating state of the refrigerator 10 and a temperature inside the refrigerator 10, and a button panel 192 including various input buttons 192*a*, may be provided with the dispenser 19. Various commands for withdrawing and inserting the storage box 132 may be input using the input buttons 192*a*.

An input button 192*a* for entering a command to withdraw the storage box 132 from or insert the storage box 132 into the refrigerator 10 may be provided in various formats such as, for example, a capacitive switch employing changes in electrostatic capacitance, a tact switch, a toggle switch, or other type of switch as appropriate. Additionally, although the input button 192*a* shown in FIG. 1 is provided at one side of the dispenser 19, the button panel 192 and/or input buttons 192*a* may alternatively be provided in a touch button configuration on a front or side surface of the refrigerator or freezer compartment door as appropriate, and not necessarily with the dispenser 19.

For example, if the input button 192*a* were provided on the front surface of the freezer compartment door 131, the input button 192*a* may include a vibration sensor switch that operates by detecting vibrations transferred to the freezer compartment door 131. That is, if, for example, a user is unable to use either hand to initiate the opening of the door 131, and instead imparts a gentle shock with, for example, a foot, to the freezer compartment door 131, the vibration transferred from the shock may be sensed and the drive motor 20 may be operated to withdraw the storage box 132 from the freezer compartment 111.

In alternative embodiments, the input button 192*a* may instead be provided on a separate remote control unit that controls various other functions of the refrigerator, or other devices within a given range. For example, an input button 192*a* that controls movement of the drawer 23 may be provided with a remote control unit that controls, for example, internal temperatures of the various compartments of the refrigerator, operation of a display module/television mounted on a surface of the refrigerator, and the like.

A drawer movement apparatus according to an embodiment as broadly described herein is shown in more detail in FIGS. 3 and 4. As discussed above, the anti-wobble, or alignment apparatus may include the suspended portion 18 and the guide rack 172, and the suspended portion 18 may include the shaft 181 and the pinion 182. Although in this embodiment the guide rack 172 and the pinion 182 form the alignment apparatus, these elements may be structured differently as long as they perform the anti-wobble and/or alignment function. For example, a roller surrounded by a friction member may be used instead of the pinion 182, and a friction member that contacts the roller, instead of the guide rack 172, to generate friction may be used to slide the storage box 132 into and out of the refrigerator 10 without slippage.

The drive motor 20 may be an inner rotor type motor, and the pinion 182 may be connected to a motor shaft 22 connected to the rotor. The drive motor 20 may be any motor capable of both forward and reverse rotation and variable speed operation.

Such a rotor and stator, or other components forming the drive motor 20, may be protected by a housing 21. A fastening mount 31 may extend from the frame 15, and the fastening mount 31 and the housing 21 of the drive motor 20 may be coupled by a bracket 30. Accordingly, the assembly of the drive motor 20 and the suspended portion 18 may be fixedly coupled to a rear portion of the frame 15, and the pinion 182 may be coupled to the motor shaft 22 so that pinion 182 may be rotated by the motor 20.

The drive motor 20 may be fixed to the frame 15 by various methods which all fall within the spirit and scope as presented herein. Also, the drive motor 20 may be fixed to the rear of the moving rail 162 instead of to the frame 15. In alternative embodiments, the drive motor 20 may be integrally provided with the frame 15.

Figure 5:
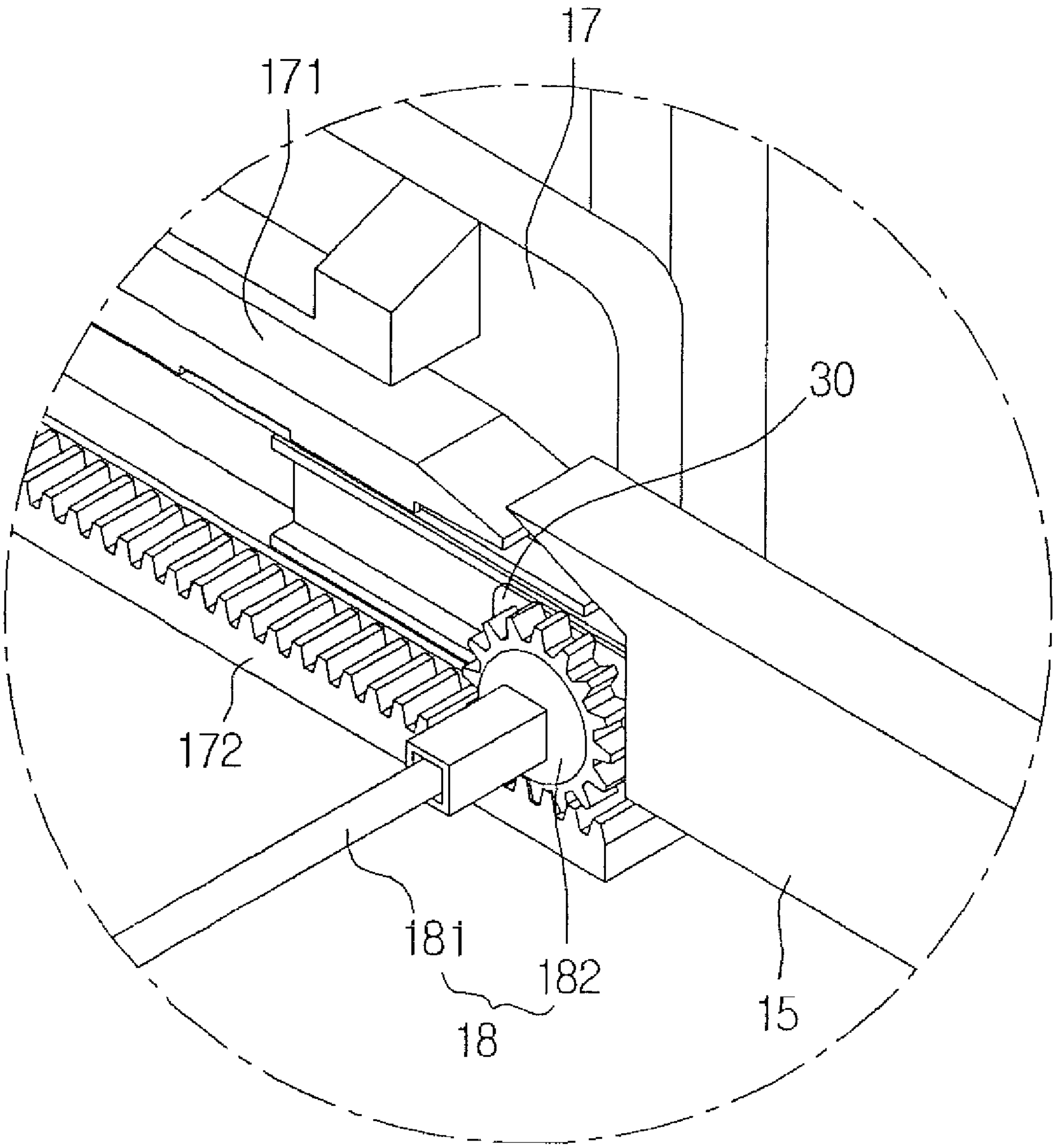
FIG. 5 is a partial perspective view of a suspended portion of the movement apparatus shown in FIG. 3.

The drive motor 20 shown in FIG. 5 is provided at only one end of the suspended portion 18. However, in alternative embodiments, a driving force generator, or drive motor 20, may be provided for each of the pinions 182 at opposite ends of the shaft 181. More specifically, as discussed above, a pinion 182 may be provided at each of the two opposite ends of the shaft 181. At an end of the suspended portion 18 to which a drive motor 20 is not provided, the shaft 181 may pass through the pinion 182 and be inserted into the frame 15. In other words, the bracket 30 provided at this side of the frame 15 may be repositioned such that the shaft 181 passes through the pinion 182 and is inserted into the bracket 30 to securely couple the shaft 181 to the frame 15 and prevent disengagement of one end of the storage box 132 from the frame 15 or lateral wobbling/mis-alignment of the storage box 132 during withdrawal and insertion of the storage box 132.

Alternatively, the end of the shaft 181 may instead be inserted into a rear portion of the moving rail 162, as described above.

The automatic movement process of a storage box 132 from a refrigerator 10 provided with a storage box movement apparatus as embodied and broadly described herein will now be discussed.

In order to withdraw the storage box 132 from a corresponding compartment of the refrigerator 10, a user first actuates an input button 192*a*, which, as discussed above, may be provided at one side of the dispenser 19, on a surface of the refrigerator 10, or on a remote control unit, as appropriate. Similarly, actuation of the input button 192*a* may be accomplished by simply pushing the button 192*a*, or by imparting an external shock to an appropriate portion of the refrigerator 10 to actuate a vibration sensor switch. When the input button 192*a* is actuated to initiate a storage box withdrawing command, the command is transmitted to a controller (not shown in detail) of the refrigerator 10. The controller of the refrigerator 10 transmits an operation signal to a drive motor controller that controls the operation of the drive motor 20. This operation signal may include, for example, directional data for moving the storage box 132 either out of or into the refrigerator 10, and moving speed data for the storage box 132. That is, the directional data indicates which direction the drive motor 20 should be rotated, and the speed data indicates a number of revolutions per minute (RPM) of the drive motor 20 to achieve a particular speed.

The drive motor 20 may then be driven according to the operation signal in order to move the door 131 and storage box 132 accordingly. This allows the storage box 132 to be automatically withdrawn from the refrigerator 10 without requiring a user to apply a specific, physical withdrawing movement, thus eliminating the need for a separate handle member on the front surface of the door 131. Thus, the door 131 may have a flush front surface without any protrusions to provide a clean exterior finish, and to provide an inner cover coupled to the rear of the outer cover with an insulator interposed therebetween to preserve the insulative qualities of the refrigerator 10.

The controller of the refrigerator 10 may receive RPM data associated with the rotation of the drive motor 20 in real time, and may calculate the withdrawing speed (in m/s or other unit, as appropriate) of the storage box 132 accordingly. For example, using the rotating speed of the drive motor 20 and a circumferential value of the pinion 182, the moving speed of the storage box 132 can be calculated per unit time. Using this data, the storage box 132 may be withdrawn at a preset speed, regardless of the weight of food stored in the storage box 132. In certain embodiments, the preset speed may be a speed which is selected by a user, and which may also be altered based on user preferences.

The storage box 132 may be continuously or intermittently withdrawn from or inserted into the refrigerator 10 according to how the input button 192_a_ is manipulated. For example, the storage box 132 may be controlled so that it is completely withdrawn if the input button 192_a_ is pressed once and/or held for a predetermined amount of time. Similarly, the storage box 132 may be controlled so that it is withdrawn in stages if the input button 192_a_ is pressed repeatedly with a certain interval in between pressings. Other arrangements may also be appropriate.

The storage box 132 may also be controlled so that its movement is automatically stopped if the storage box 132 encounters an obstacle as the storage box 132 is moved.

The storage box 132 may be controlled so that it is stopped when it has been withdrawn a predetermined distance, and may be controlled so that it is either reinserted or withdrawn completely, based on the user's particular intentions. For example, if the storage box 132 has been stopped after being withdrawn a predetermined distance, the storage box 132 may then be completely withdrawn when a user pulls the door 131, or the storage box 132 may be re-inserted into the refrigerator 10 when a user pushes the freezer compartment door 131.

If a storage box withdrawal command is input through the input button 192_a_, and the storage box 132 is not in a withdrawn or open state, or stops during withdrawal, this may be sensed and an error signal may be generated. The storage box 132 may be controlled so that it is automatically closed when left in a withdrawn or open state for more than a predetermined amount of time, in order to minimize cold air loss.

The storage box 132 of a refrigerator 10 according to embodiments as broadly described herein may not only be automatically withdrawn, but withdrawn manually as well. For example, in the event of a power outage where power cannot be supplied to the drive motor 20, or when a user does not manipulate the input button 192_a_ but instead grasps and pulls or pushes the door 131 by hand, the storage box 132 is not subjected to resistance from the drive motor 20 and may be smoothly withdrawn or re-inserted into the refrigerator 10. In other words, even when the drive motor 20 does not operate, withdrawal of the storage box 132 is not impeded by the drive motor 20.

As an alternative to the drive motor 20 being connected to the controller of the refrigerator 10 by a plurality of signal wires and receiving power through a plurality of electrical wires, a charging apparatus may be provided with the drive motor 20 to eliminate the need for electrical wires, and a short range wireless transmitter-receiver system may be provided to eliminate the need for signal wires and electrical wires.

Although, for ease of discussion, the drawer movement apparatus has to this point been applied to the movement of a freezer compartment door in a bottom freezer type refrigerator, it is well understood that such an apparatus can be applied to advantageous effect in other types of household appliances. For example, a drawer movement apparatus as embodied and broadly described herein may be applied to a side-by-side refrigerator, to a refrigerator having multiple segregated compartments stacked either vertically or horizontally, or other arrangement as appropriate.

Figure 6:
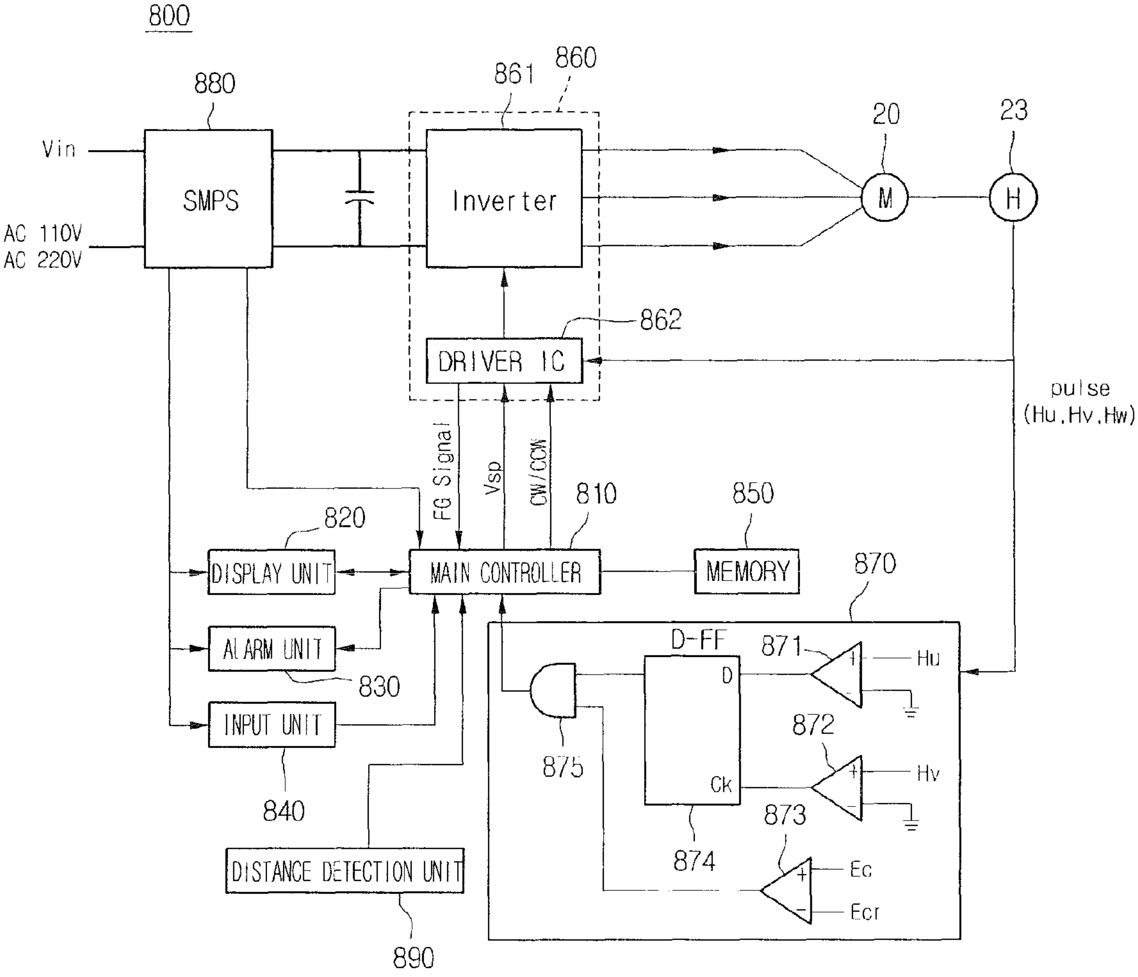
FIG. 6 is a block diagram of a driving system for a drawer of a refrigerator according to embodiments as broadly described herein.

FIG. 6 is a block diagram of a driving system for a drawer of a refrigerator according to embodiments as broadly described herein.

The driving system 800 may include a main controller 810 that controls overall operation of the refrigerator 10, a motor controller 860 that controls driving of the drive motor 20, an input unit 840 that receives commands for moving, or withdrawing and inserting, the drawer 13 and transmits the received commands to the main controller 810, a display 820 that displays various information, such as, for example, an operating state of the refrigerator 10, a warning unit 830 that issues a warning when a system error occurs during operation of the refrigerator 10, a memory 850 that stores various data from the motor controller 860 and the input unit 840, a switched-mode power supply (SMPS) 880 that applies power to various electrical components to operate the refrigerator 10, and a rotating direction detecting unit 870 that outputs a signal that indicates a rotation direction of the drive motor 20, such as, for example a LOW or HIGH signal according to whether the drive motor 20 is rotating in a forward or in a reverse direction. A distance detection unit 890, such as, for example, the distance detection sensor 24 described above, may include a variety of different types of sensors, including, for example, an infrared sensor or an ultrasonic wave sensor, to detect a movement distance of the drawer 13.

In certain embodiments, the drive motor 20 may include a stator and a rotor, and may be a 3-phase brushless direct current (BLDC) motor with 3 hall sensors ($H_U$,$H_V$,$H_W$) 23 provided with the rotor. The motor controller 860 may include a driver integrated circuit (IC) 862 that receives a motor driving signal from the main controller 810 to control operation of the drive motor 20, and an inverter 861 that receives a DC voltage applied from the SMPS 880 and applies a 3-phase current to the drive motor 20 according to a switching signal transmitted from the driver IC 862.

Operation of the driving system for the drawer will now be discussed.

First, the SMPS 880 transforms and rectifies an incoming 110V or 220V alternating current (AC) to direct current (DC) and outputs a DC voltage of a predetermined level such as, for example, a DC of 220V. The inverter 861 switches the DC voltage applied by the SMPS 880 to generate a 3-phase AC voltage having a sine waveform. The 3-phase AC voltage output from the inverter 861 may include, for example, a U-phase, a V-phase, and a W-phase voltage.

If, as discussed above, the drive motor 20 is a BLDC motor provided with hall sensors 23, power may be applied to the drive motor 20 to rotate the rotor. That is, a switching signal may be transmitted from the driver IC 862 to the inverter 861, and the inverter 861 may apply a voltage to each of three coil windings U, V, and W wound around the stator based on the switching signal having a 120° phase shift.

Thus, based on, for example, a drawer withdrawal command received by the input unit 840, the main controller 810 transmits a speed command signal $V_{SP}$ and a rotation direction command signal CW/CCW to the motor controller 860 to rotate the drive motor 20 accordingly.

As the drive motor 20 rotates, the hall sensors 23 generate detecting sensors, or pulses, based on a number of poles of permanent magnets provided on the rotor. For example, if the number of poles of the permanent magnet(s) provided on the rotor is 8, then 24 pulses are generated for every rotation of the drive motor 20, e.g., a number of pulses per rotation may be equal to a number of magnets times a number of hall sensors.

The pulse signals $H_U$, $H_V$ and $H_W$ generated by the hall sensors 23 are transmitted to the driver IC 862 and the rotating direction detecting unit 870. The rotation direction detecting unit 870 uses the pulse signals $H_U$, $H_V$ and $H_W$ to detect the rotating direction of the drive motor 20, and transmits the detected data to the main controller 810.

The driver IC 862 uses the pulse signals $H_U$, $H_V$ and $H_W$ to generate a frequency generator (FG) pulse signal. That is, in an FG circuit provided within the driver IC 862, the pulse signals $H_U$, $H_V$ and $H_W$ output from the hall sensors 23 are used to generate and output FG pulse signals corresponding to a number of rotations of the drive motor 20. For example, if there were A numbers of FG pulse signals for every rotation of the drive motor 20, and B numbers of actual FG pulse signals were generated during a particular withdrawal of the drawer 13, the number of rotations of the drive motor 20 would be B/A. Also, because the rotation direction of the drive motor 20 may be sensed by the rotating direction detecting unit 870, the number of FG pulse signals may be counted as a positive value when the rotating direction of the drive motor 20 is forward, and the number may be counted as a negative value for reverse rotation. Thus, an absolute position of the drive motor 20 or the drawer 13 may be determined, and it may also be determined whether the drawer 13 has been manually pushed or pulled. The memory 850 stores data on the number of FG pulse signals in a table based on a moved distance of the drawer 13.

FG pulse signals are transmitted from the driver IC 862 to the main controller 810. The main controller 810 uses the transmitted FG pulse signals to calculate the rotating speed of the drive motor 20. Also, by using the rotating speed and time of the drive motor 20, the main controller may also calculate a corresponding moved speed and moved distance of the drive motor 20, and/or a corresponding moved speed and moved distance of the drawer 13.

Figure 7:
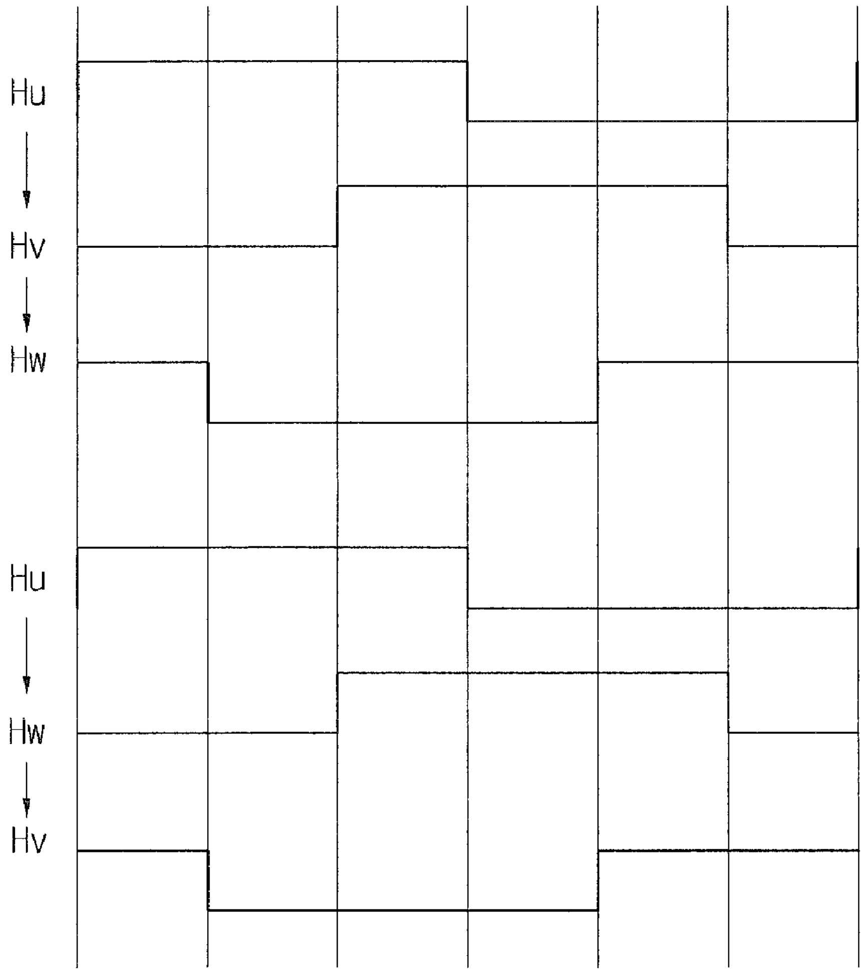
FIG. 7 is a waveform chart showing the shape of a pulse signal detected by a hall sensor based on a direction of rotation of a drive motor.

When the rotor of the drive motor 20 rotates, pulse signals $H_U$, $H_V$ and $H_W$ may be detected by the respective hall sensors 23, as shown in FIG. 7. That is, when the drive motor 20 rotates in a forward direction, the pulse signals may be detected in the sequence $H_U \rightarrow H_V \rightarrow H_W$. Likewise, the pulse signals $H_U$, $H_V$ and $H_W$ may be detected in the sequence $H_U \rightarrow H_W \rightarrow H_V$ for reverse rotation. The rotating direction detecting unit 870 may compare a portion of the signals $H_U$, $H_V$ and $H_W$ sensed by the hall sensors 23 to a zero-level reference value, and then determine rotating direction of the drive motor 20 based on this comparison.

For this purpose, the rotating direction detecting unit 870 may include a first comparator 871 that compares a first signal output from the hall sensors 23 with a reference signal, and a second comparator 872 that compares a second signal output from the hall sensors 23 to a reference signal. The rotating direction detecting unit 870 may also include a D-flip flop (DFF) 874 that designates a signal output from the first comparator 871 as an input signal D, inverts a signal output from the second comparator 872 and performs logic-combining to yield a clock signal CK, and outputs corresponding output signals. A third comparator 873 compares and outputs two driving voltages Ec and Ecr that are variable based on kick, brake, and other control functions of the drive motor 20. An AND gate 875 logic-combines an output of the D-flip flop 874 with an output of the third comparator 873.

The AND gate 875 may then output a HIGH signal when the rotating direction detecting unit 870 determines that the drive motor 20 is rotating in reverse, and a LOW signal when the drive motor 20 is rotating in a forward direction. The HIGH signal or LOW signal may be transmitted to the main controller 810, and the main controller 810 may store data on a current rotation direction of the drive motor 20 in the memory 850. The FG pulse signal transmitted from the driver IC 862 may also be stored in the memory 850.

Figure 8:
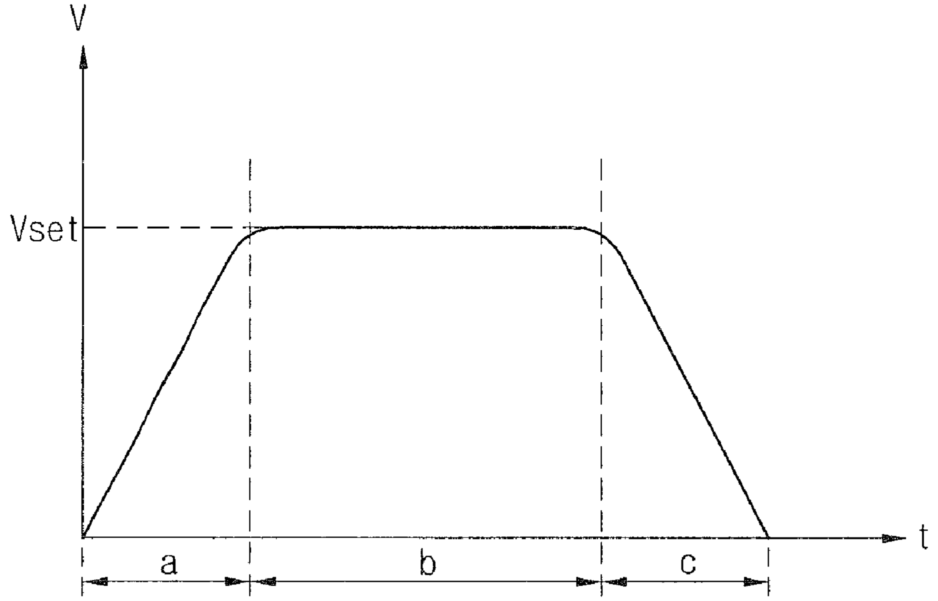
FIG. 8 is a graph showing the moving speed of a drawer of a refrigerator when moved by a driving system according to embodiments as broadly described herein.

FIG. 8 is a graph of moving speed V of a drawer 13 of a refrigerator 10 over time t as the drawer 13 is withdrawn.

In certain embodiments, the drive motor 20 may move integrally with the drawer 13, so that the moving speed and moving distance of the drawer 13 correspond to the moving speed and moving distance of the drive motor 20.

Thus, when a drawer withdrawal command is received, a speed of the drawer 13 increases as it moves at an acceleration rate (a) until it attains a preset speed ($V_{SET}$). When the drawer 13 reaches the preset speed $V_{SET}$, it moves at a constant speed (b), i.e., with little to no acceleration. At a predetermined time, before a reference point at which the drawer 13 is considered completely open, a speed of the drawer 13 is reduced at a deceleration rate (c). This is to prevent the drawer 13 from continuing to accelerate until it is completely open, thus preventing the drawer 13 from generating a noisy "thunk" at the completion of its opening and/or any damage to the drawer 13 or the movement apparatus. Thus, the accelerating region (a) occupies a relatively small portion of the overall movement of the drawer 13.

The process of closing the drawer 13 from a completely open state may involve a similar speed distribution as in the opening process.

If a preset time elapses after the drawer 13 has been moved to an open position, and no command to move the drawer again has been received or an external force exerted, the drawer 13 may automatically close to minimize unnecessary loss of cold air.

Due to the weight of items stored in the drawer 13, the drawer 13 may be unable to maintain a regular speed distribution as it is moved. That is, when a predetermined voltage is applied to the drive motor 20, the movement speed of the drawer 13 may vary depending on the weight of the contents of the drawer 13. However, a controlling method as embodied and broadly described herein allows a drawer 13 to be consistently moved at a preset speed distribution, regardless of the effects from varying weights of items stored in the drawer 13. Such a method will now be discussed.

First, a user inputs a drawer movement command that is received by the input unit 840 and the received drawer movement command is transmitted to the main controller 810. The drawer movement command may be, for example, a command to withdraw the drawer 13 from the refrigerator 10, or to insert the drawer 13 back into the refrigerator 10. Then, the main controller 810 transmits appropriate commands to the motor controller 860 such as, for example, a rotating speed command $V_{SP}$ and a rotating direction command CW/CCW to the driver IC 862.

The speed and directional commands $V_{SP}$ and CW/CCW are transmitted from the driver IC 862 of the motor controller 860 to the inverter 861 as a switching signal corresponding to the command transmitted from the main controller 810. Thus, current in the inverter 861 is applied with respective phase shifts between three coils wound around a stator of the drive motor 20, in accordance with the input switching signal and, magnetic fields are generated at the stator coils by means of the current to rotate the rotor. The intensity of the magnetic fields formed at the rotor is detected by the hall sensors 23, and each switching device is sequentially turned ON/OFF according to the detected magnetic field intensities to continuously rotate the rotor and drive the drive motor 20.

Data on the rotating speed and rotating direction of the rotor of the drive motor 20 is transmitted to the main controller 810 according to the driving of the drive motor 20.

More specifically, when the rotor of the drive motor 20 rotates, pulse signals $H_U$, $H_V$, and $H_W$ are respectively generated by three hall sensors 23 arranged a predetermined distance apart from one another on the stator. The pulse signals $H_U$, $H_V$, and $H_W$ are transmitted to the driver IC 862 and the rotating direction detecting unit 870. The pulse signal transmitted to the driver IC 862 generates an FG pulse signal by means of the FG generating circuit and is transmitted to the main controller 810. The pulse signal transmitted to the rotating direction detecting unit 870 is detected in terms of the rotating direction of the rotor by a rotating direction detecting circuit, and is transmitted to the main controller 810.

The rotating speed or revolutions per minute (rpm) of the drive motor 20 is detected from the transmitted FG pulse signal by the main controller 810. Thus, the moving speed and moving distance of the drive motor 20 is calculated from the detected rotating speed of the drive motor 20.

In certain embodiments, the moving speed of the drive motor 20 (or moving speed of the drawer 13) may be derived from the following equations:

moving speed of drive motor (m/s)=rotating speed of drive motor (rpm)*circumference of pinion (m)/60 (1)

rotating speed of drive motor (rpm)=number of FG pulses generated per unit time (per minute)/number of FG pulses generated per rotation of drive motor (2)

The moving distance of the drive motor 20 may be derived from the moving speed of the drive motor 20 over a set duration.

Figure 9:
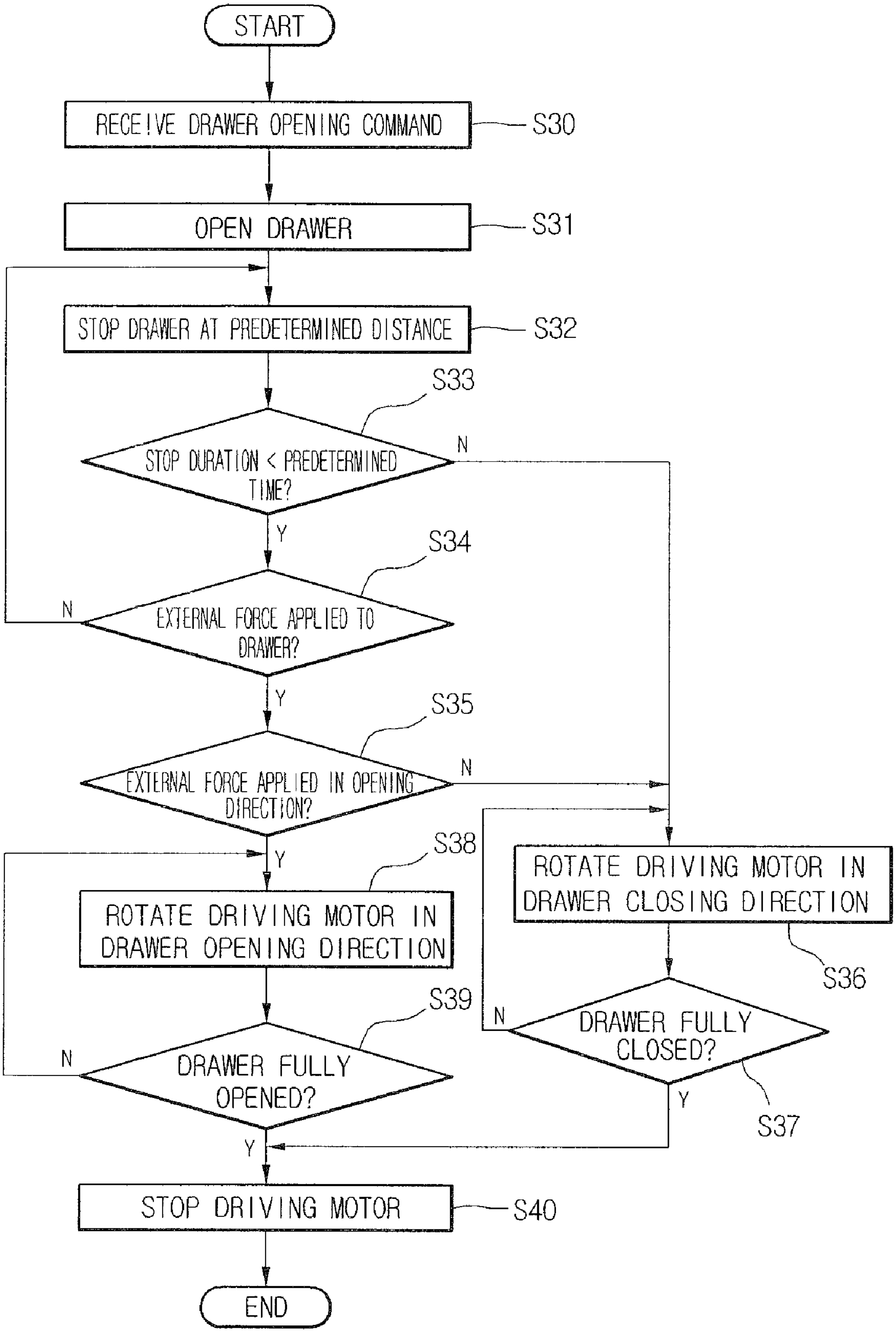
FIG. 9 is a flowchart of a method of driving a drawer of a refrigerator according to an embodiment as broadly described herein, in which the drawer is withdrawn and/or inserted in accordance with a user's intention.

FIG. 9 is a flowchart of a method of driving a drawer of a refrigerator in which a drawer may be automatically withdrawn by a predetermined distance and then stop based on a received drawer withdrawal command. That is, in a state in which the drawer is first withdrawn by the predetermined distance, the main controller 810 determines a subsequent movement/position of the drawer 13 based on a user's action to further withdraw or insert the drawer 13.

In more detail, a drawer opening command is input by a user, received by the input unit 840, and transmitted to the main controller 810 (S30). The drawer 13 is then withdrawn by a predetermined distance (S31) and stopped (S32). In this instance, the predetermined distance may be less than a distance at which the drawer 13 is fully withdrawn.

If the drawer 13 has been in the stopped state for greater than a predetermined time (S33) and no external force has been applied to the drawer 13, the drive motor 20 rotates in a reverse direction to close the drawer 13 (S36) and minimize loss of cool air. When the drawer 13 is completely closed (S37), the drive motor 20 stops operating (S40).

If the drawer 13 has been in the stopped state for less than the predetermined time (S33), the main controller 810 detects in real time if an external force is applied to the drawer 13, and, in absence of any external force, continues to do so until the drawer stop duration reaches the predetermined time (S34).

An external force applied by the user to the drawer 13 would indicate a desire to insert or further withdraw the drawer 13. The external force may be applied and released in a short amount of time. That is, the external force may be generated by the user tapping or lightly touching the drawer 13, or by other means as appropriate.

When no external force is applied to the drawer 13, the drawer 13 remains stopped at the predetermined distance and the stopping time continues to accumulate. When an external force is applied to the drawer 13, it is determined if the external force is applied in a drawer opening direction or a drawer closing direction (S35). The external force application direction may be detected by the distance detection sensor 24 or by a variation in the FG pulse signal.

When the external force is applied in the drawer opening direction, the drive motor 20 rotates in the drawer opening direction (S38) to fully open the drawer 13, and it is determined if the drawer 13 is fully open (S39). When the external force is applied in the drawer closing direction, the drive motor 20 rotates in the drawer closing direction (S36) and it is determined if the drawer 13 is fully closed or not (S37). The drive motor 20 stops rotating (S40) or keeps rotating depending on a detection result.

The detection of the full opening or full closing of the drawer 13 may be realized by analyzing the FG pulse signal or using the distance detection sensor 24. In addition, other methods may be used to detect the full opening or full closing of the drawer 13. For example, a detection unit provided on a typical refrigerator may be used and, the full opening or full closing of the drawer may be detected by an on/off switch provided on a rear surface of the door 131 and a front surface of the main body 11, or other arrangement(s) as appropriate.

Figure 10:
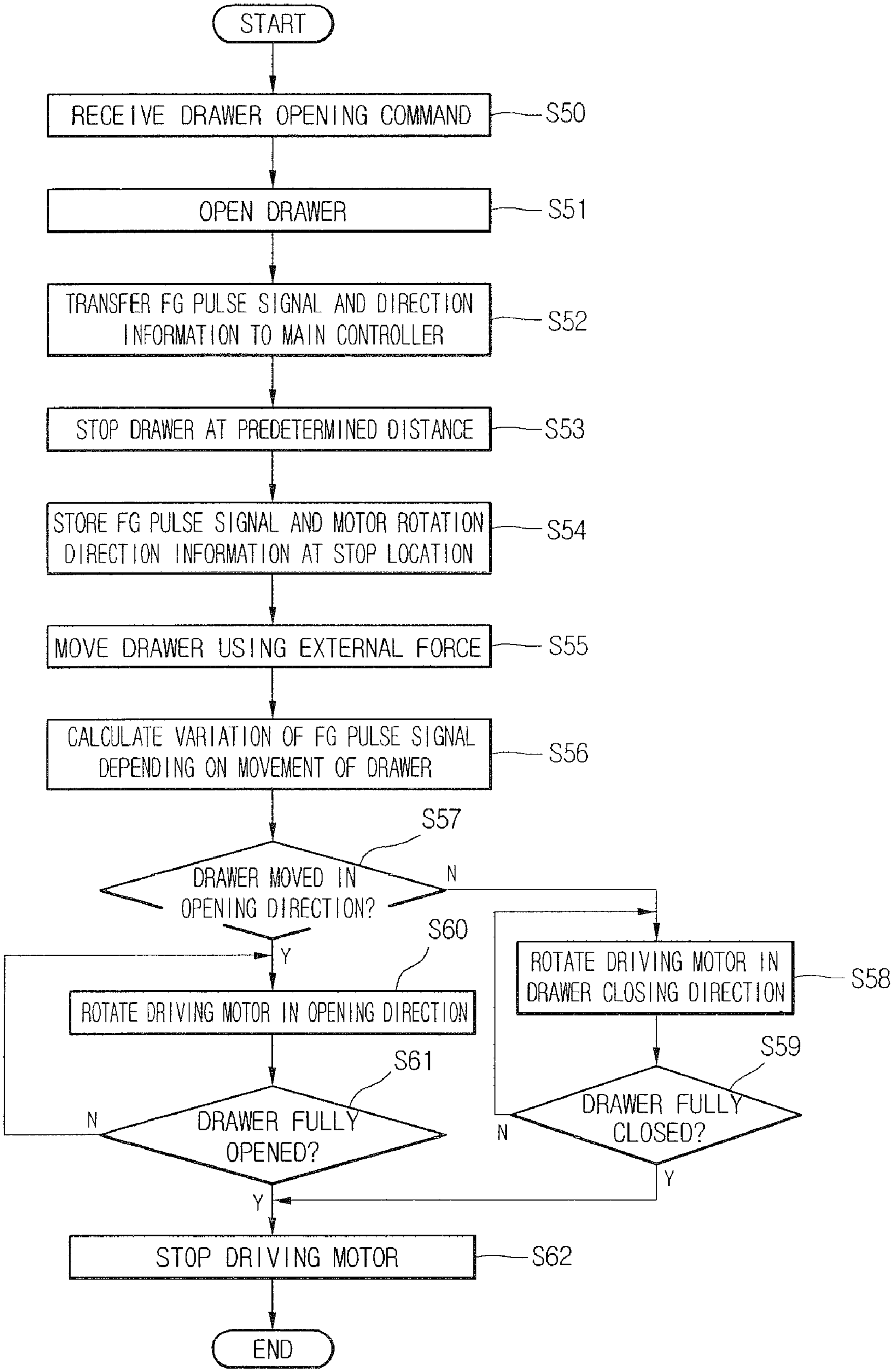
FIG. 10 is a flowchart of a method of driving a drawer of a refrigerator according to an embodiment as broadly described herein, in which an FG pulse signal generated by a motor controller is used to control movement of the drawer.

FIG. 10 is a flowchart of a method of driving a drawer of a refrigerator using an FG pulse signal generated by a motor controller.

First, a drawer opening command is input by the user and received by the input unit 840 (S50) and the drawer 13 is opened (S51). Information on the FG pulse signal and the moving direction generated as the drawer 13 moves is transmitted to the main controller 810 (S52). The drawer 13 stops at the predetermined distance (S53), and the information on the FG pulse signal and the motor rotational direction at the stop location is stored in the memory 850 (S54).

When the drawer 13 moves in response to an external force (S55), the main controller 810 calculates a variation in the FG pulse signal based on a direction/type of movement of the drawer 13 (S56). In more detail, when the drawer 13 moves in response to the externally applied force, this causes the pinion 182 and the motor shaft 22 connected to the pinion 182 to rotate together. As the motor shaft 22 rotates, a corresponding pulse signal is generated through the hall sensor 23 and the driver IC 862 generates a corresponding FG pulse signal based on the pulse signal from the hall sensor 23.

In certain embodiments, if the variation in the FG pulse signal is a positive value, it is determined that the motor 20 is rotating in a forward direction, and a negative value indicates that the motor 20 is rotating in a reverse direction.

It is then determined if the drawer 13 is moving in the opening direction or the closing direction based on the variation in the FG pulse signal (S57). When it is determined that the drawer 13 is moving in the opening direction, the drive motor 20 rotates in the drawer opening direction to further open the drawer 13. When it is determined that the drawer 13 is moving in the closing direction, the drive motor 20 rotates in the drawer 13 closing direction (S58) to initiate a closing movement. It is determined if the drawer 13 is fully opened or not (S61), or fully closed or not (S59), and the drive motor 20 either continues to operate (in either the forward or reverse direction, as appropriate) or stops operating based on the results of the determination (S62).

Figure 11:
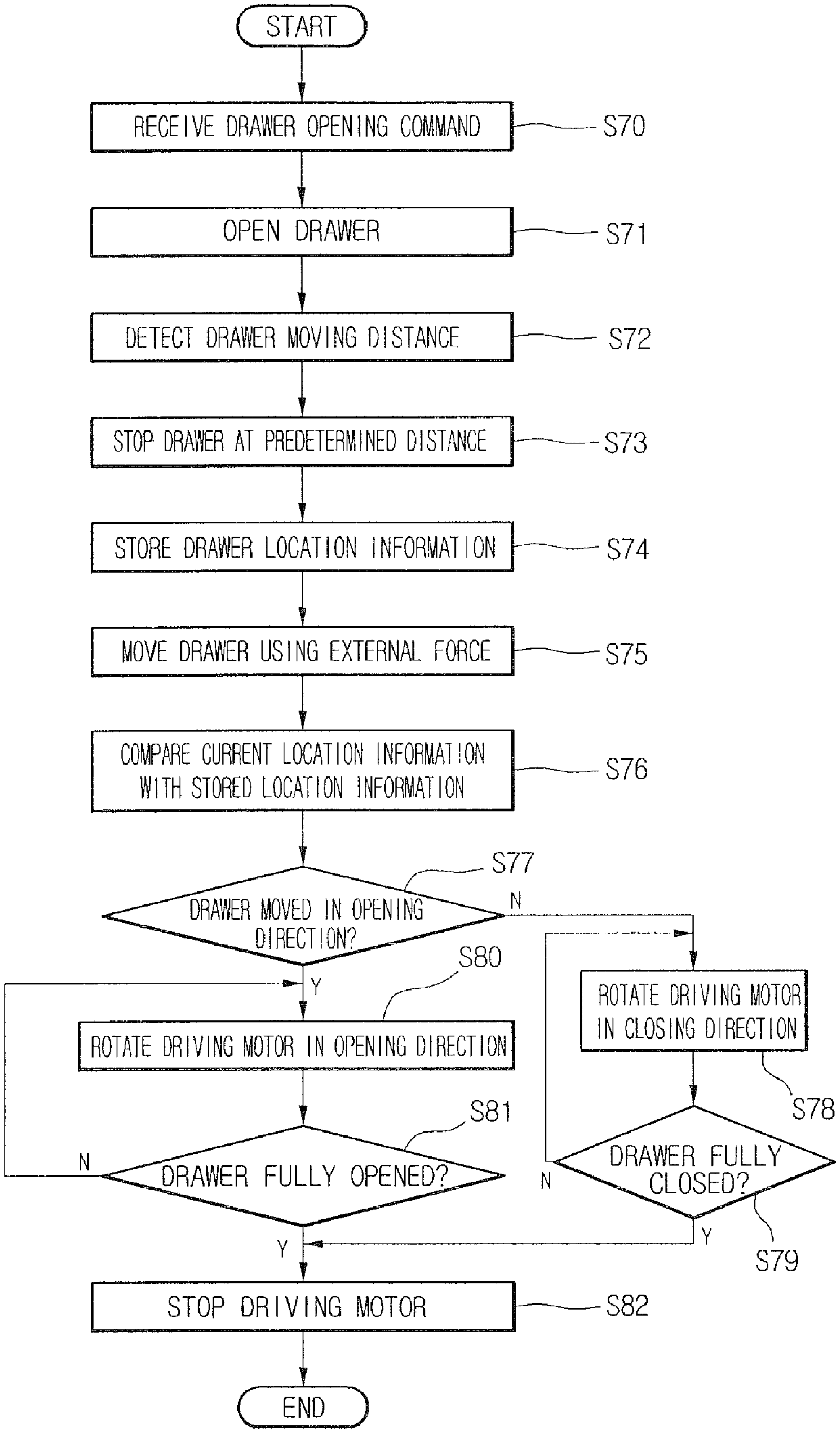
FIG. 11 is a flowchart of a method of driving a drawer of a refrigerator according to an embodiment as broadly described herein, in which a distance detection sensor is used to control movement of the drawer.

FIG. 11 is a flowchart a method of driving a drawer of a refrigerator using a distance detection sensor.

First, a drawer opening command is input at and received by the input unit 840 (S70) and the drawer 13 is opened (S71).

A drawer moving distance is detected by a distance detection sensor 24, as previously discussed, as the drawer 13 is moving (S72). The drawer 13 is stopped at the predetermined distance (S73), and drawer location information at a point where the drawer 13 has stopped is stored in the memory 850 (S74).

When the drawer 13 moves in response to an externally applied force (S75), the distance detection sensor 24 detects a variation in location of the drawer 13. In more detail, the main controller 810 compares current drawer location information with the previous drawer location information that was last stored in the memory 850 (S76), and the main controller 810 determines if the drawer 13 is moving in the opening direction or the closing direction based on this comparison (S77).

When it is determined that the drawer 13 is moving in the opening direction, the drive motor 20 rotates in the forward direction (S89) to fully open the drawer 13. When it is determined that the drawer 13 is moving in the closing direction, the drive motor 20 rotates in the reverse direction (S78) to fully close the drawer 13. The drive motor 20 stops rotating (S82) or keeps rotating in the appropriate direction depending on whether the drawer 13 is fully opened (S81) or closed (S79).

In a control method as embodied and broadly described herein, the drawer 13 may be withdrawn by a predetermined distance and then stop until it is impacted by an external force or until a predetermined amount of time elapses. However, this method may also be applied when the drawer 13 is already in a fully closed state, or already in a fully opened state. That is, when the drawer 13 is in the fully closed state and the user applies an external force in the drawer opening direction, the controller 810 may detect this external force and automatically open the drawer 13. Likewise, when the drawer 13 is in the fully opened state and the user applies an external force in the drawer closing direction, the controller 810 may detect this external force and automatically close the drawer 13. In alternative embodiments, a user my stop the opening of the drawer by exerting a prescribed amount of force in a direction opposite to the opening direction. Similarly, a user may stop the closing of the drawer by exerting a prescribed amount of force in a direction opposite to the closing direction.

When the drawer 13 is fully closed, the FG pulse signal value becomes 0. As movement in the opening direction due to an external force is initiated, the rotational direction of the drive motor 20 is detected from the pulse value of the hall sensor 23 generated when the drawer 13 begins to open. The controller 810 detects the drawer moving direction.

When the drawer 13 is fully open, the pulse signal is calculated as a positive value and stored in the memory 850, and the rotational direction of the drive motor 20 is detected from the pulse value of the hall sensor 23 when the drawer 13 begins to close. The controller 810 detects the drawer moving direction and the FG pulse value is integrated as a negative value as the drawer 13 moves.

In alternative embodiments, a user may input a full opening command or a full closing command using, for example, an input button 192*a*. That is, if the drawer 13 is opened by a predetermined distance, the user may load items into the storage box 132 and then input a closing command using the input button 192*a*. Activation of the button 192*a* causes the drive motor 20 to rotate in the reverse direction to close the drawer 13. When it is determined that there is a need to fully open the drawer 13 for the loading of items, the user may input a full opening command using the input button 192*a*, causing the drive motor 20 to rotate in the forward direction to fully open the drawer 13.

In a system and method for driving a drawer of a refrigerator as embodied and broadly described herein, the drawer may be automatically opened and automatically closed in accordance with the user's intention A storage box type refrigerator is provided that does not require a handle structure to withdraw a storage box.

A refrigerator is provided that allows for automatic withdrawal of a storage box according to a user's wishes, by means of an improved withdrawing structure for a refrigerator storage box.

A refrigerator is provided with a structure for fixedly installing an improved driving unit that withdraws and inserts a storage box of a refrigerator to minimize reductions in interior storage volume and insulating effectiveness of the refrigerator.

A system and method is provided for driving a drawer of a refrigerator that can always withdraw and insert a storage box at a preset speed regardless of the weight of food stored therein.

A system and method is provided which can automatically withdraw a storage box from and insert a storage box into a main body of a refrigerator in accordance with a user's intention, even when the storage box has been withdrawn by a predetermined distance and then stops prior to reaching a desired distance.

A drawer driving system as embodied and broadly described herein includes a drive motor that rotates to withdraw a drawer to a predetermined distance; and a controller for controlling an operation of the drive motor, wherein the controller controls the operation of the drive motor such that the drawer moves in a direction in which an external force is applied to the drawer in a state where the drawer stops.

A method for controlling driving of a drawer as embodied and broadly described herein includes detecting external force applied to the drawer that is in a stationary state; transferring an external force detecting signal to a controller; determining an application direction of an external force; and moving the drawer in the application direction of the external force.

In a movement structure for a storage box of a refrigerator and a refrigerator equipped with such a movement structure, the storage box may be automatically withdrawn or inserted, thus having the effect of providing greater convenience of use. Moreover, because the storage box can be withdrawn automatically, the storage box can be conveniently withdrawn regardless of the weight of food stored in the storage box.

Additionally, a separate handle is not required for withdrawing and inserting a storage box from/into a refrigerator. This allows the external design of the refrigerator to have a clean finish, and the space in which the refrigerator is installed to be efficiently utilized.

Further, because the drive motor moves together with the storage box, this structure uses a minimal amount of storage space and has a minimum impact on insulating qualities of the refrigerator main body.

Additionally, because the drawer is substantially always withdrawn or inserted at a preset speed regardless of the weight of food stored inside the storage box, reliability of the drawer driving system is increased.

Further, since the storage box is automatically withdrawn or inserted in accordance with the user's intention or action, even when the storage box is withdrawn by a predetermined distance and stops, thus not completing the user's intention or action, the cool air loss can be reduced.

For example, when a drawer withdrawing command is received, the storage box is withdrawn by a corresponding predetermined distance. In this instance, if it is possible to load or take out items from the storage box with the storage box withdrawn by the predetermined distance, there is no need to fully withdraw the drawer and, the drawer is fully withdrawn in accordance with the user's selection only when there is a need to further withdraw the drawer. Therefore, cool air loss can be minimized.

Any reference in this specification to "one embodiment," "an embodiment," "example embodiment," "certain embodiment," "alternative embodiment," etc., means that a particular feature, structure, or characteristic described in connection with the embodiment is included in at least one embodiment as broadly described herein. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various numerous variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A method of controlling an operation of a drawer in a refrigerator, the method comprising:

detecting an external force applied to a drawer that is in a prescribed state;

transmitting an external force detecting signal to a controller;

determining an application direction of the external force; and moving the drawer in the application direction of the external force, comprising:

moving the drawer from a fully open stationary state in response to an external force applied in a first direction corresponding to an insertion direction and inserting the drawer into the refrigerator.

2. The method of claim 1, wherein moving the drawer in the application direction of the external force further comprises:

moving the drawer from a fully closed stationary state in response to an external force applied in a second direction corresponding to a withdrawal direction and withdrawing the drawer from the refrigerator; and moving the drawer from a partially open stationary state in response to an external force applied in the first direction and inserting the drawer into the refrigerator.

3. The method of claim 1, wherein detecting an external force applied to the drawer comprises analyzing a pulse signal that is output by a hall sensor of a drive motor as the drawer moves and the drive motor rotates.

4. The method of claim 3, wherein determining an application direction of the external force comprises detecting a rotational direction of the drive motor based on the pulse signal output by the hall sensor.

5. The method of claim 3, further comprising:

analyzing a frequency generator (FG) pulse signal generated by the drive motor, wherein the FG pulse signal is generated based on a moving direction of the drawer; and calculating a moving velocity and a moving distance of the drawer based on the analysis of the FG pulse signal.

6. The method of claim 5, further comprising:

calculating a variation in the FG pulse signal; and determining the application direction of the external force applied to the drawer and a current location of the drawer based on the variation in the FG pulse signal.

7. The method of claim 6, wherein the moving direction of the drawer corresponds to the application direction of the external force, and wherein analyzing a frequency generator (FG) pulse signal comprises:

applying the FG pulse signal as a positive value when the drawer moves in a first direction; and applying the FG pulse signal as a negative value when the drawer moves in a second direction.

8. The method of claim 1, wherein detecting an external force applied to the drawer comprises detecting a change in a distance of the drawer from a reference point using a distance detection sensor.

9. The method of claim 8, wherein determining an application direction of the external force comprises detecting a direction of change in location of the drawer using the distance detection sensor.

10. The method of claim 1, further comprising automatically closing the drawer if an external force is not detected within a predetermined amount of time.

11. The method of claim 1, further comprising receiving an opening command through an input button and automatically opening the drawer to the stationary state prior to detecting an external force applied to the drawer, or manually opening the drawer to the stationary state prior to detecting the external force applied to the drawer.

12. A drawer driving system for a refrigerator, the system comprising:

a drive motor that transfers a rotational force to a drawer coupled thereto; and a controller configured to control the drive motor in response to an external force applied to the drawer, wherein the controller is configured to control the drive motor to move the drawer from a fully open stationary state in response to an external force applied in a first direction corresponding to an insertion direction to insert the drawer into the refrigerator, and to control the drive motor to move the drawer from a fully closed stationary state in response to an external force applied in a second direction corresponding to a withdrawal direction to withdraw the drawer from the refrigerator.

13. The system of claim 12, further comprising:

a rotational direction detecting unit that detects a rotational direction of the drive motor and transfers a corresponding signal to the controller; and an alarm unit operably coupled to the controller, wherein the alarm unit issues an alert in response to a malfunction of the drive motor.

14. The system of claim 12, wherein the controller comprises:

a main controller that receives a drawer movement command from an input unit and generates a corresponding driving command; and a motor controller that receives the driving command from the main controller and drives the drive motor in accordance with the driving command.

15. The system of claim 14, wherein the motor controller comprises:

a driver integrated circuit (IC) that generates a switching signal based on a driving condition of the drive motor; and an inverter that applies a current to the drive motor based on the switching signal generated by the driver IC.

16. The system of claim 15, wherein the driver IC receives a frequency generator (FG) pulse from the drive motor as the drive motor rotates, and transmits a corresponding FG pulse signal to the main controller.

17. The system of claim 16, wherein the main controller applies the FG pulse signal as a positive value or a negative value based on a direction of rotation of the drive motor.

18. The system of claim 12, further comprising a distance detection unit provided on one of the drive motor, the drawer, or an inner case of a refrigerator to which the drawer is movably coupled, wherein the distance detection unit detects a moving distance of the drawer as the drawer moves.

19. The system of claim 18, wherein the distance detection unit detects a direction of movement of the drawer, and wherein a direction of movement of the drawer corresponds to the application direction of the external force.

20. The system of claim 12, wherein the drive motor is brushless direct current (BDLC) motor provided with a hall sensor.

21. The system of claim 18, wherein the distance detection unit is an infrared sensor or an ultrasonic wave sensor.

22. A method of controlling a position of a drawer relative to a compartment provided in a refrigerator, the method comprising automatically moving the drawer based on a direction of a force applied to the drawer, comprising:

moving the drawer from an initial position to a fully opened position in response to application of a first force in a first direction; and moving the drawer from an initial position to a fully closed position in response to application of a second force in a second direction, the second direction being opposite the first direction.

23. The method of claim 22, wherein the first direction is away from compartment and the second direction is toward the compartment.

24. The method of claim 22, wherein the initial position of the drawer is one of a fully opened position, a fully closed position or a partially closed position prior to the first or second force being applied to the drawer.

25. The method of claim 22, wherein the drawer is automatically moved using a motor provided on the drawer.

26. The method of claim 25, wherein the direction of the force is determined based on a rotational direction of the motor.

27. The method of claim 22, wherein the drawer includes a sensor to detect distance, wherein the sensor generates a signal indicative of a movement direction when the force is applied to the drawer.

28. The method of claim 22, further comprising automatically stopping a current movement of the drawer in response to an application of force to the drawer in a direction that is opposite to a direction of the current movement.

29. The method of claim 22, further comprising closing the drawer after a prescribed period of time has elapsed, either prior to or after the application of force to the drawer.

30. The system of claim 12, wherein the controller is further configured to move the drawer from a partially open stationary state in response to an external force applied in the first direction to insert the drawer into the refrigerator.

* * * * *